US006154336A

United States Patent [19]

Uemura et al.

[11] Patent Number: 6,154,336

[45] **Date of Patent: *Nov. 28, 2000**

[54] FRAME SYNCHRONIZING CIRCUIT IN A MAGNETIC RECORDING AND REPRODUCING APPARATUS AND A FRAME SYNCHRONIZING METHOD THEREOF

[75] Inventors: Toshiro Uemura; Masahiro Fujikawa, both of Saitama-ken, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/699,780

[22] Filed: Aug. 20, 1996

[30] Foreign Application Priority Data

Aug. 21, 1995 [JP] Japan .................................... 7-211671

[51] Int. Cl.[7] ..................................................... G11B 5/584

[52] U.S. Cl. ..................................... 360/77.14; 360/73.08

[58] Field of Search ............................. 360/77.12, 77.13, 360/77.14, 77.15, 72.2, 51, 73.08; 386/57, 58, 61, 62, 88, 84, 71, 66

[56] References Cited

U.S. PATENT DOCUMENTS

| | | | |
|---|---|---|---|
| 3,643,012 | 2/1972 | Clark | 360/70 |
| 4,954,902 | 9/1990 | Furuhata et al. | 360/77.14 |
| 5,280,399 | 1/1994 | Owada | 360/77.14 |
| 5,398,140 | 3/1995 | Rhodes et al. | 360/77.14 X |
| 5,490,017 | 2/1996 | Nakamura et al. | 360/77.14 X |
| 5,546,248 | 8/1996 | Sakakibara et al. | 360/70 X |
| 5,617,268 | 4/1997 | Sakakibara et al. | 360/70 X |
| 5,648,879 | 7/1997 | Takano | 360/77.14 X |
| 5,892,982 | 4/1999 | Mitsuda et al. | 395/882 |

FOREIGN PATENT DOCUMENTS

| | | |
|---|---|---|
| 574238 | 12/1993 | European Pat. Off. . |
| 4-285746 | 10/1992 | Japan . |
| 2221811 | 2/1990 | United Kingdom . |

OTHER PUBLICATIONS

Patent Abstract of Japan, vol. 018, No. 535 (E–1615), Jul. 8, 1994, Takeo, Magnetic Recording and Reproducing Device.

Patent Abstract of Japan, vol. 018, No. 152 (E–1523), Dec. 10, 1993, Koji, Magnetic Recording and Reproducing Device.

Patent Abstract of Japan, vol. 017, No. 084 (P–1490), Oct. 9, 1992, Makoto, Reproducing Device.

*Primary Examiner*—Andrew L. Sniezek

*Attorney, Agent, or Firm*—Pillsbury Madison & Sutro LLP

[57] ABSTRACT

A reproducing signal read out by a reproducing head is transmitted to a demodulator including a track number detecting circuit through a reproducing amplifier. A microcomputer performs tracking control by controlling the rotation of a capstan based on the error information obtained by a tracking error detector. A reference frame pulse generating circuit 101 of the microcomputer performs frame synchronization by generating a reference frame pulse synchronized with the reference pulse of a drum generated by a drum reference generating part based on the predetermined track number (for example, the head value of the track numbers) of the track numbers of a reproducing frame detected by the track number detecting circuit.

9 Claims, 8 Drawing Sheets

FRAME SYNCHRONIZING CIRCUIT IN A MAGNETIC RECORDING AND REPRODUCING APPARATUS AND A FRAME SYNCHRONIZING METHOD THEREOF

BACKGROUND OF THE INVENTION

1. Field of the Invention

The present invention relates to a magnetic recording and reproducing apparatus and a magnetic recording and reproducing method thereof in which one frame consists of tracks the number of which is a multiple of an even number and the data processing in recording and reproducing is performed in a frame unit, and more particularly to a frame synchronizing method for synchronizing the phase of a reference frame pulse with that of a reproducing frame indicated by a track number in a frame of a reproducing signal in tracking control.

2. Description of the Related Art

Recently, a helical scan type magnetic recording and reproducing apparatus using a magnetic tape as a recording medium has been developed as a data recording and reproducing apparatus of a computer or the like.

Conventionally, in this kind of magnetic recording and reproducing apparatus, one frame consists of tracks the number of which is a multiple of an even number and the data processing in recording and reproducing is performed using a reference frame pulse representing a frame unit. That is, though recording and reproducing is performed for each track by a recording and reproducing head based on the reference frame pulse to the magnetic tape, the data processing of recording and reproducing is executed in a frame unit.

Therefore, for example, suppose one frame consists of ten tracks, the tracks (track numbers 0 through 10) of a frame reproduced by a magnetic head should be arranged in order from the head of the reference frame pulse generated in the magnetic recording and reproducing apparatus in reproducing, that is, the track number of the reproducing frame should be synchronized with the phase of the reference frame pulse. If the phase of the reproducing frame is not synchronized with that of the reference frame, it will be impossible to reproduce data.

Conventionally, this kind of frame synchronizing method that synchronizes the phase of the reproducing frame with that of the reference frame, as the magnetic recording and reproducing apparatus shown in Japanese Published Unexamined Patent Application No. Heisei 4-285746, includes detecting the recorded track information (the track number of the reproducing frame) by executing usual tracking control first, and as a result, if the phase of the reproducing frame were different from that of the reference frame, tape feeding is accelerated or decelerated forcedly according to the difference between the phases to synchronize the phase of the reproducing frame with that of the reference frame after destroying tracking once.

FIGS. 7 and 8 are examples of timing charts explaining a frame synchronizing method according to prior examples.

FIG. 7 shows a relation between the phase of the reference frame pulse and that of the recording track in recording. FIG. 7(A) shows a reference frame pulse in recording. FIG. 7(B) shows a track with track numbers in recording. In recording, the track is recorded in order from the head of the reference frame pulses (for example, at a point of rising) by giving track numbers 0 through 9.

FIG. 8 shows a frame synchronizing method in reproducing. FIG. 8(A) shows a reference frame pulse in reproducing. FIG. 8(B) shows one example of a reproducing track that is actually reproduced. FIG. 8(C) shows a reproducing track having a correct phase with respect to a reference frame pulse. FIG. 8(D) shows on and off of capstan operation (that is, tape feeding operation) controlled for synchronization in the case of reproducing tracks of FIG. 8(B).

In the reproducing frame (the reproducing track) as shown in FIG. 8(B), for example, it is supposed that the tracking control operation is started for a period before an arrow a, tracking is locked (that is, the reproducing head is tracked at the center of the reproducing track) and the track number 2 is detected from the reproducing frame at the point of a (that is, at the point of falling of the reference frame pulse). If the position of tracking at this point of time is a phase in which the fourth track is actually on the reproducing frame under the correct relation of the phase as shown in FIG. 8(C) to the reference frame pulse as shown in FIG. 8(A), it is possible to synchronize the reproducing frame shown in FIG. 8(B) with the reference frame pulse shown in FIG. 8(A) by stopping the capstan as shown in FIG. 8(D) (capstan off) at this position to stop running a tape once, then, by continuing stopping running the tape up to the phase in which the detected second track originally comes to the reference frame pulse as shown in FIG. 8(A), and by running the tape by rotating the capstan (capstan on) as shown in FIG. 8(D) again when coming to the point of b. That is, the point of a corresponds to the point of falling of the reference frame pulse, and judging from that the control means in the apparatus may stop running the tape for a time corresponding to the eight tracks when the reproducing track number 2 is detected at the point of a, the capstan is turned on after the capstan is turned off up to the point of b that a time corresponding to eight tracks has passed. Thus, the reproducing frame is synchronized with the reference frame. Then, the tracking control is performed and tracking is drawn in.

However, the frame synchronizing method of the above-mentioned conventional magnetic recording and reproducing apparatus takes eight tracks to synchronize the phase after stopping the running of the tape and destroying tracking once as shown in FIG. 8. Eight tracks is a lengthy period of time to wait for synchronization Further, it was necessary to control capstan velocity and tracking from the point of b again. The disadvantages in this process include slow synchronization of the frame, the necessity of reinitiating the tracking and that the rising was slow in reproducing.

As mentioned above, in the conventional frame synchronizing method, in order to synchronize the phase of the reference frame with that of the reproducing frame, tracking was controlled first. Then information such as the recorded track numbers was detected and the phase of the reproducing frame (the reproducing track) was recognized. If the phase of the reproducing frame had been different from that of the reference frame, tape feeding should have been accelerated or decelerated forcedly, tracking drawn in once should be destroyed and the phases of both frames should have been synchronized, and then tracking should have been drawn in again. Therefore, synchronizing the phase of the frames, tracking, and the rising in reproducing took too much time to accomplish.

SUMMARY OF THE INVENTION

An object of the present invention is to provide a magnetic recording and reproducing apparatus and a magnetic recording and reproducing method thereof in which it is possible to draw in tracking without destroying tracking and it is possible to synchronize the phase of a reproducing frame with that of a reference frame much quicker than the prior art.

Another object of the present invention is to provide a magnetic recording and reproducing apparatus and a magnetic recording and reproducing method thereof in which it is possible to synchronize the phase of the reference frame with that of the reproducing frame only by electrical processing without mechanical on and off operation.

A first embodiment according to the present invention is a magnetic recording and reproducing apparatus in which one frame consists of tracks the number of which is a multiple of an even number and the data processing is performed in a frame unit using a reference frame pulse in recording and reproducing. The apparatus comprises:

recording means for recording the recording information including a pilot signal containing the tracking information in reproducing and track numbers that show the track order on a magnetic tape by a recording head to form tracks successively, tracking controlling means for reproducing the recorded information including the pilot signal by a reproducing head, obtaining a tracking error information based on a reproducing pilot signal, and performing tracking between the reproducing head and the track of the reproducing frame by using the tracking error information, reproducing means including a track number detecting circuit that demodulates the recorded information reproduced by the reproducing head and detects the track number of the reproducing frame from the demodulated output, and reference frame pulse generating means for generating a reference frame pulse at a timing that the predetermined track number of the track numbers detected by the track number detecting circuit is detected and providing the reference frame pulse it to the recording means and the reproducing means.

A second embodiment according to the present invention is a magnetic recording and reproducing apparatus in which one frame consists of tracks the number of which is a multiple of an even number and the data processing is performed in a frame unit using a reference frame pulse in recording and reproducing. The apparatus comprises:

recording means for recording the recording information including a pilot signal containing tracking information in reproducing and the track numbers that show the track order on a magnetic tape by a recording head to form tracks successively, tracking controlling means for reproducing the recorded information including the pilot signal by a reproducing head, obtaining a tracking error information based on a reproducing pilot signal, and performing tracking between the reproducing head and the track of the reproducing frame by using the tracking error information, reproducing means including a track number detecting circuit that demodulates the recorded information reproduced by the reproducing head and detects the track number of the reproducing frame from the demodulated output, reset pulse generating means for generating a reset pulse at a timing that the predetermined track number of the track numbers detected by the track number detecting circuit is detected, and reference frame pulse generating means for generating a reference frame pulse, synchronizing the phase of the reference frame pulse with that of the track of the reproducing frame by resetting the phase of the reference frame pulse by a reset pulse generated by the reset pulse generating means, and providing the reference frame pulse to the recording means and the reproducing means.

Further, a third embodiment according to the present invention is the magnetic recording and reproducing apparatus of the second embodiment, wherein, when a plurality of tracks of which a reproducing frame consists are divided into a small number front half period and a large number rear half period, a timing that generates the reset pulse is for a large number rear half period of the reproducing frame.

DETAILED DESCRITION OF THE PREFERRED EMBODIMENTS

Embodiments of the present invention will be described referring to drawings as follows.

Figure 1:
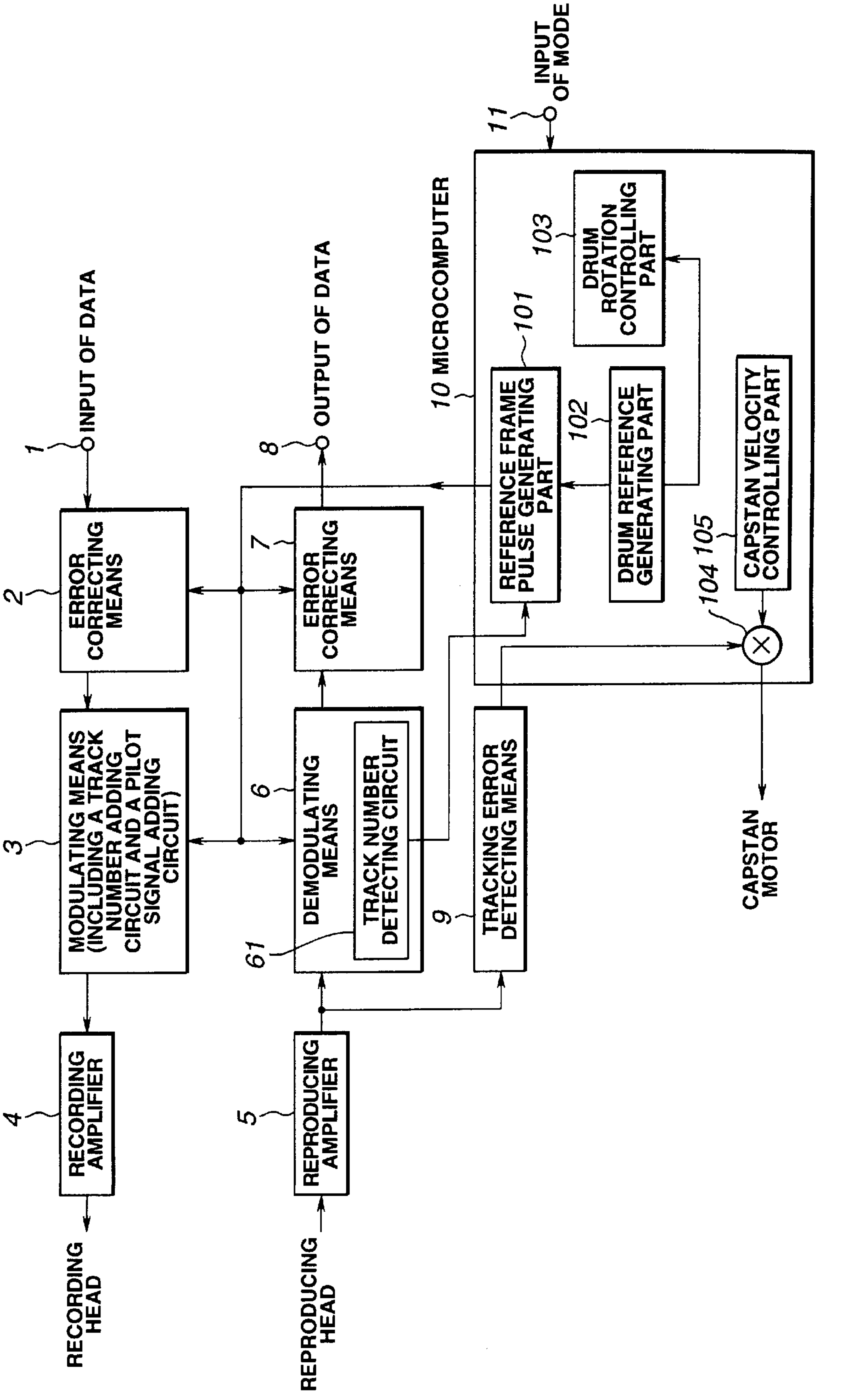
FIG. 1 is a block diagram showing one embodiment of a magnetic recording and reproducing apparatus of the present invention.

FIG. 1 is a block diagram showing a structure of one embodiment of a magnetic recording and reproducing apparatus of the present invention using a frame synchronizing method.

In FIG. 1, a data signal of a computer or the like provided to an input terminal 1 is modulated to a signal form fitted to record on a tape by a modulating means 3 after the processing for correcting the error in reproducing is performed by an error correcting means 2, and then a track number is added, a pilot signal is added and it is possible to provide it to a recording head (not shown) through a recording amplifier 4. A recording means comprises the error correcting means 2, the modulating means 3, the recording amplifier 4 and the recording head.

In reproducing, the modulated data recorded on a tape by the recording head is reproduced by a reproducing head (not shown) and provided to a demodulating means 6 through a reproducing amplifier 5, and the modulated data is also provided to a tracking error detecting means 9. The demodulating means 6 includes a demodulating part (not shown) and a track number detecting circuit 61. The data demodulated by the demodulating means 6 is outputted from an output terminal 8 as the reproduced data after an error is further corrected by an error correcting means 7. A reproducing means comprises the reproducing head, the reproducing amplifier 5, the demodulating means 6 and the error correcting means 7.

The tracking error detecting means 9 detects tracking error information from a pilot signal in the reproducing signal inputted from the reproducing amplifier 5, and transmits the output to a mixer 104 that will be described below. A tracking controlling means that performs tracking between the reproducing head and the track of the reproducing frame by using the tracking error information comprises the reproducing amplifier 5, the tracking error detecting means 9 and the mixer 104.

A track number detecting circuit 61 detects the track number on a magnetic tape that is being reproduced at present from the reproducing signal inputted from the reproducing amplifier 5 and transmits it to a reference frame pulse generating part 101 in a microcomputer 10.

The microcomputer 10 comprises a reference frame pulse generating part 101, a drum reference generating part 102, a drum rotation controlling part 103, a mixer 104, a capstan velocity controlling part 105 and a mode setting means (not shown) that is possible to set the recording/reproducing mode corresponding to the mode input from an input terminal 11.

Though the reference frame pulse generating part 101 generates a reference frame pulse synchronized with the reference pulse of the rotation drum generated by the drum reference generating part 102 both in recording and in reproducing, when the predetermined track number (for example, the track number is 0) from the track number detecting circuit 61 is detected in reproducing, the head part of the reference frame pulse rises synchronized with this. In recording, the reference frame pulse generating part 101 generates a reference frame pulse based on only the drum reference pulse from the drum reference generating part 102.

The drum reference generating part 102 generates a drum reference pulse controlling the number of rotation of the rotating drum on which the recording and reproducing head is loaded. This drum reference pulse is provided to a drum rotation controlling part 103 controlling the rotation of the drum, thereby the rotation of the drum is controlled so that the drum is rotated once during a cycle of the provided drum reference pulse. Two recording or reproducing heads are attached to the drum, and it is possible to record two tracks per one rotation of the drum on a tape or to reproduce two tracks from the tape.

The reference frame pulse from the reference frame pulse generating part 101 is provided to the error correcting means 2 and the modulating means 3 in recording, and the error correction and the modulating processing are performed based on the reference frame pulse by the error correcting means 2 and the modulating means 3.

The reference frame pulse from the reference frame pulse generating part 101 is provided to the demodulating means 6 and the error correcting means 7 in reproducing, and the demodulating processing and the error correction are performed based on the reference frame pulse by the demodulating means 6 and the error correcting means 7.

A capstan velocity controlling part 105 in the microcomputer 10 generates a velocity control signal for running the tape at a velocity corresponding to the input mode and provides it to the input terminal of one of a mixer 104. The tracking error detecting signal from the tracking error detecting means 9 is provided to another input terminal of the mixer 104.

At the mixer 104, the capstan velocity controlling signal from the capstan velocity controlling part 105 and the tracking error detecting signal from the tracking error detecting means 9 are mixed and provided to a capstan motor (not shown). Further, the capstan motor rotates the capstan connected with the rotatable shaft. The rotation velocity information of the capstan is obtained as an FG signal for feedback from a frequency generator (FG) installed at the capstan motor and the capstan velocity controlling part 105 executes turbo controlling based on the FG signal.

Figures 2A, 2B:
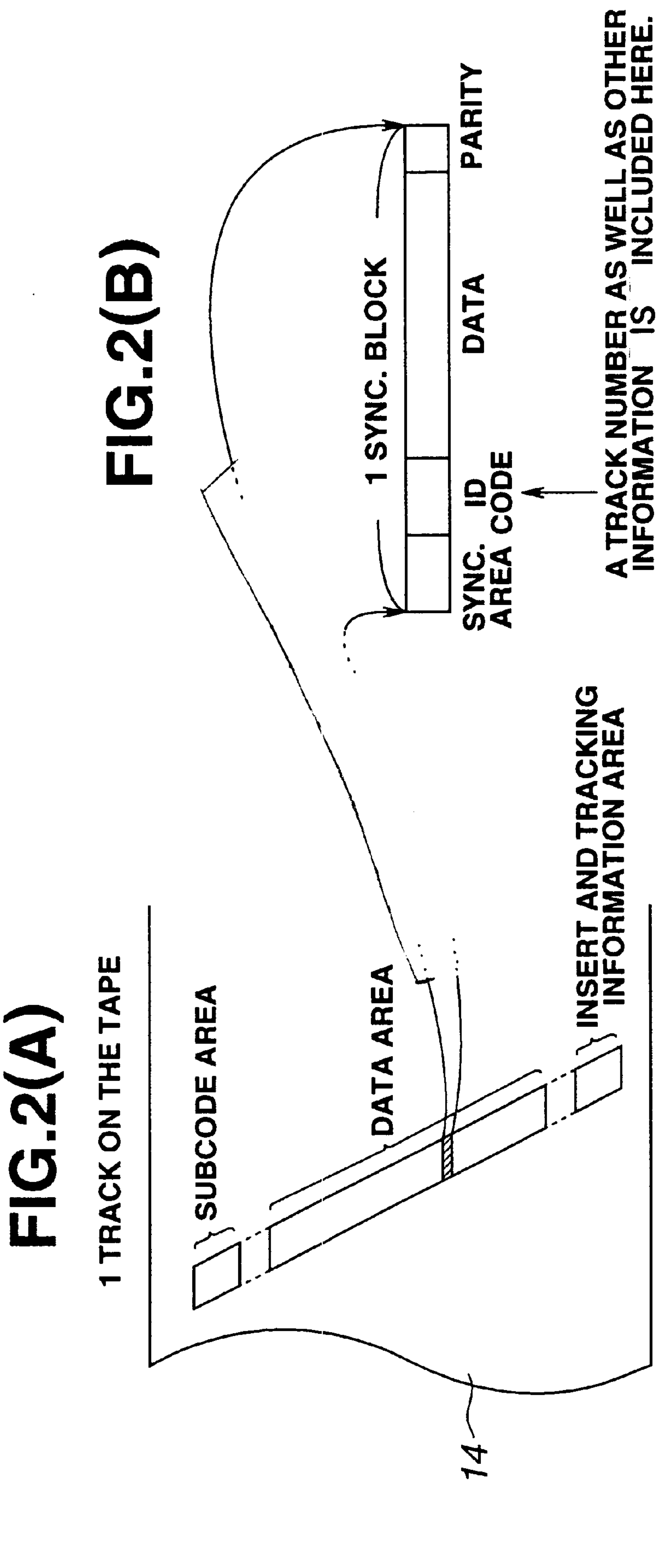
FIGS. 2(A) and (B) are drawings explaining an arrangement of data on one track.

FIGS. 2(A) and (B) show a structure of data recorded on the tape track. In FIG. 2(A), a reference numeral 14 is a magnetic tape on which the signal in which one frame consists of a plurality of (an even multiple) tracks is recorded. One of tracks comprises an insertion and tracking information area, a subcode area and so on in addition to the data area. A data area consists of a plurality of sync. blocks, and one sync. block consists of a sync. area, an ID code, data and a parity area as shown in FIG. 2(B). In ID code, the track number as well as other information is included.

Next, the operation of the embodiment is described.

Figure 7A:
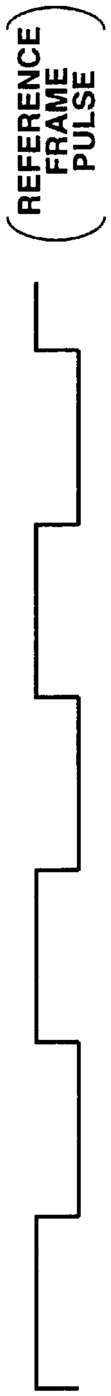
FIGS. 7(A) and (B) are timing charts showing a relation between the phase of the reference frame pulse and that of the recording track in recording.
Figure 7B:
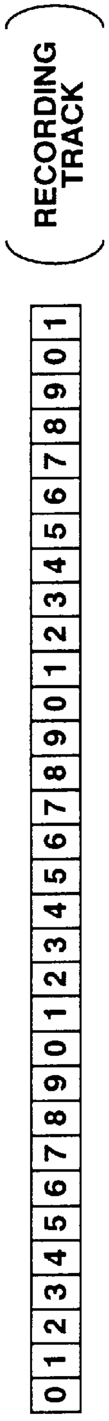

First, the operation in recording is described. When a recording mode signal is inputted to the mode input terminal 11, the reference frame pulse generating part 101 generates a reference frame pulse, as shown in FIG. 7(A), synchronized with the drum reference pulse generated by the drum reference generating part 102, and provides it to the error correction means 2 and the modulating means 3. The error correcting means 2 and the modulating means 3 perform the error correction and modulating operation based on the reference frame pulse. That is, the data signal of the computer or the like provided to the input terminal 1 is processed for error correction in reproducing based on the reference frame pulse by the error correction means 2, and is modulated to the signal form fitted to record the tape based on the reference frame pulse by the modulating means 3. At this time, the track number is added and the pilot signal is added. The track number is numbered in turn from the head (rising edge) of the reference frame pulse as shown in FIG. 7(B). The modulated signal in which the modulation processing has been performed and the track number and the pilot signal are added is provided to a recording head (not shown) through the recording amplifier 4.

Next, the operation in reproducing which is a characteristic operation of the present invention is described.

The reproducing signal read from a magnetic tape (not shown) by the reproducing head is transmitted to the demodulating means 6 including a track number detecting circuit 61 through the reproducing amplifier 5 and the tracking error detecting means 9. The tracking error detecting means 9 detects the pilot signal included in the inputted reproducing signal, detects the tracking error information from the difference between the levels of more than two kinds of pilot signals obtained, and transmits the obtained error information to the microcomputer 10. The microcomputer 10 mixes the inputted error information with the capstan velocity information from the capstan velocity controlling part 105 corresponding to the reproducing mode, controls the rotation of the capstan that runs a tape (not shown) based on it and adjusts tracking.

On the other hand, at the track number detecting circuit 61 in the demodulating means 6, the track number of the reproducing frame is detected from the inputted reproducing signal, and the detected track number is transmitted to the reference frame pulse generating part 101 in the microcomputer 10. The reference frame pulse generating part 101 of the microcomputer 10 generates a reference frame pulse. The reference frame pulse is synchronized so that the pulse head (rising edge) is synchronized with the drum reference pulse from the drum reference generating part 102 and is started from the predetermined value (for example, track number 0) of the transmitted track number.

Figures 3A, 3B, 3C:
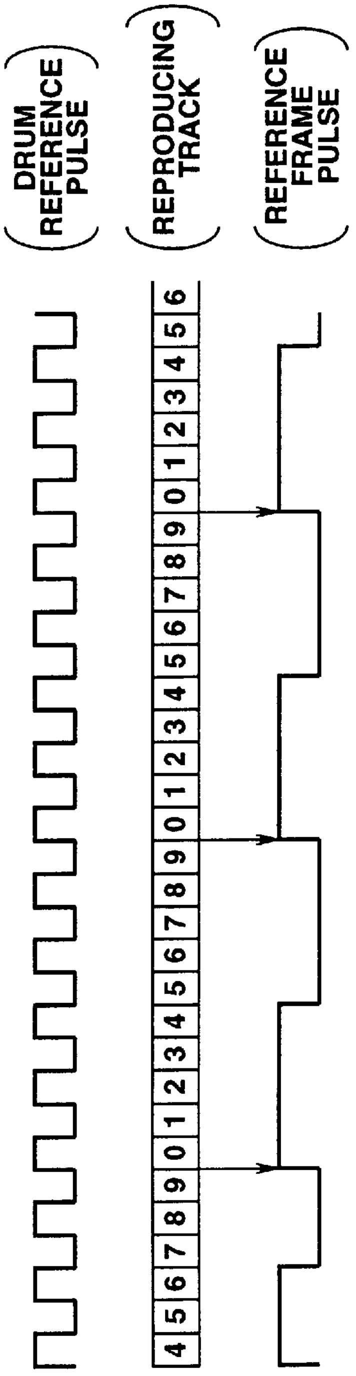
FIGS. 3(A) through (C) are timing charts explaining the generation of a reference frame pulse by a reference frame pulse generating part shown in FIG. 1.

FIGS. 3(A), (B) and (C) show the timing charts explaining the generation of a reference frame pulse. In this example, the case in which one frame consists of ten tracks is described. When the track number detecting circuit 61 detects a time when the track number of the reproducing track is 0 as shown in FIG. 3(B), the reference frame pulse generating part 101 generates a reference frame pulse as shown in FIG. 3(C) synchronized with the drum reference pulse as shown in FIG. 3(A) so that the level of the pulse is high for a period when the track numbers are 0 to 4, and is low for a period when the following track numbers are 5 to 9. For example, when the reference frame pulse as shown in FIG. 3(C) is at 30 Hz, the drum reference pulse as shown in FIG. 3(A) is set at 150 Hz. In the track number detecting circuit 61, the track number detecting circuit 61 may detect the track number 9 and make the level of the reference frame pulse high at the edge of the following track number.

Figures 8A, 8B, 8C, 8D:
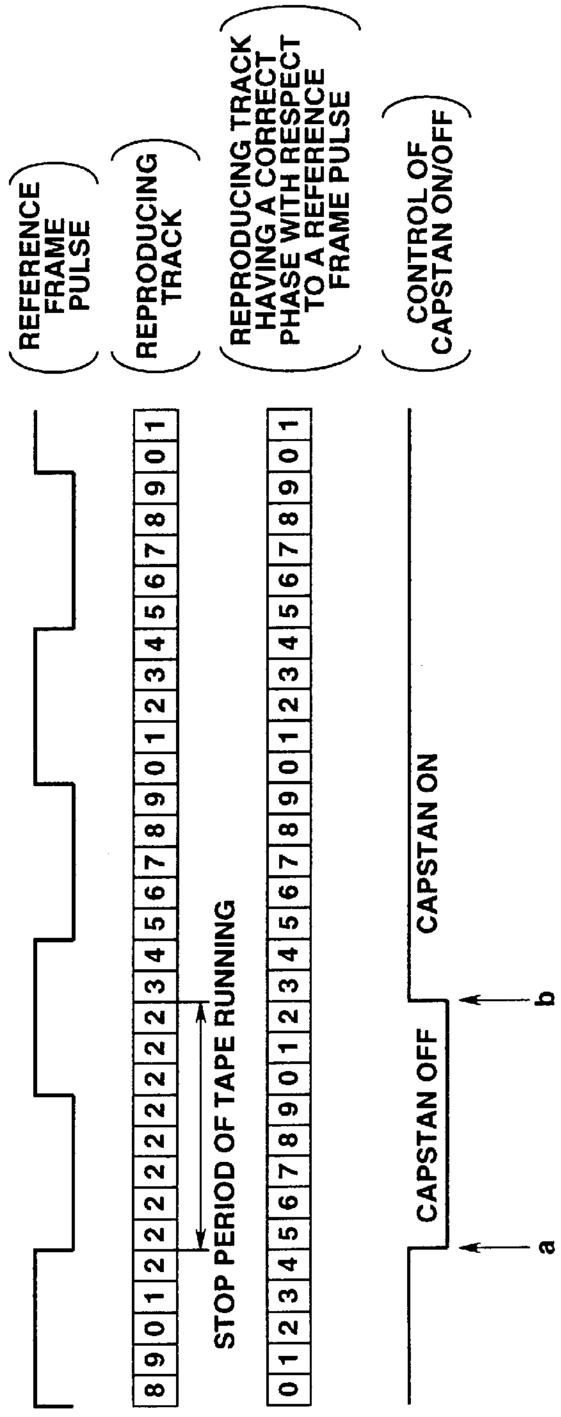
FIGS. 8(A) through (D) are timing charts explaining a frame synchronizing method according to a prior art.

According to the present embodiment, as the phase of the reproducing frame is fitted to the phase of the reference frame by generating a reference frame pulse corresponding to the predetermined tracking number of the reproducing frame after locking tracking, it is possible to synchronize the reproducing frame with the reference frame as soon as tracking is locked first without destroying the tracking that has been locked once, and is possible to perform rising quickly in reproducing of the magnetic recording and reproducing apparatus. This is an operation to synchronize the phase of the reproducing frame with that of the reference frame, that is, to synchronize the generating timing of the reference frame with the reproducing track of the predetermined number. The operation of the present embodiment is very quick comparing to the operation to synchronize the reproducing frame to the reference frame by stopping running the tape (capstan off) in prior art (FIG. 8).

Figure 4:
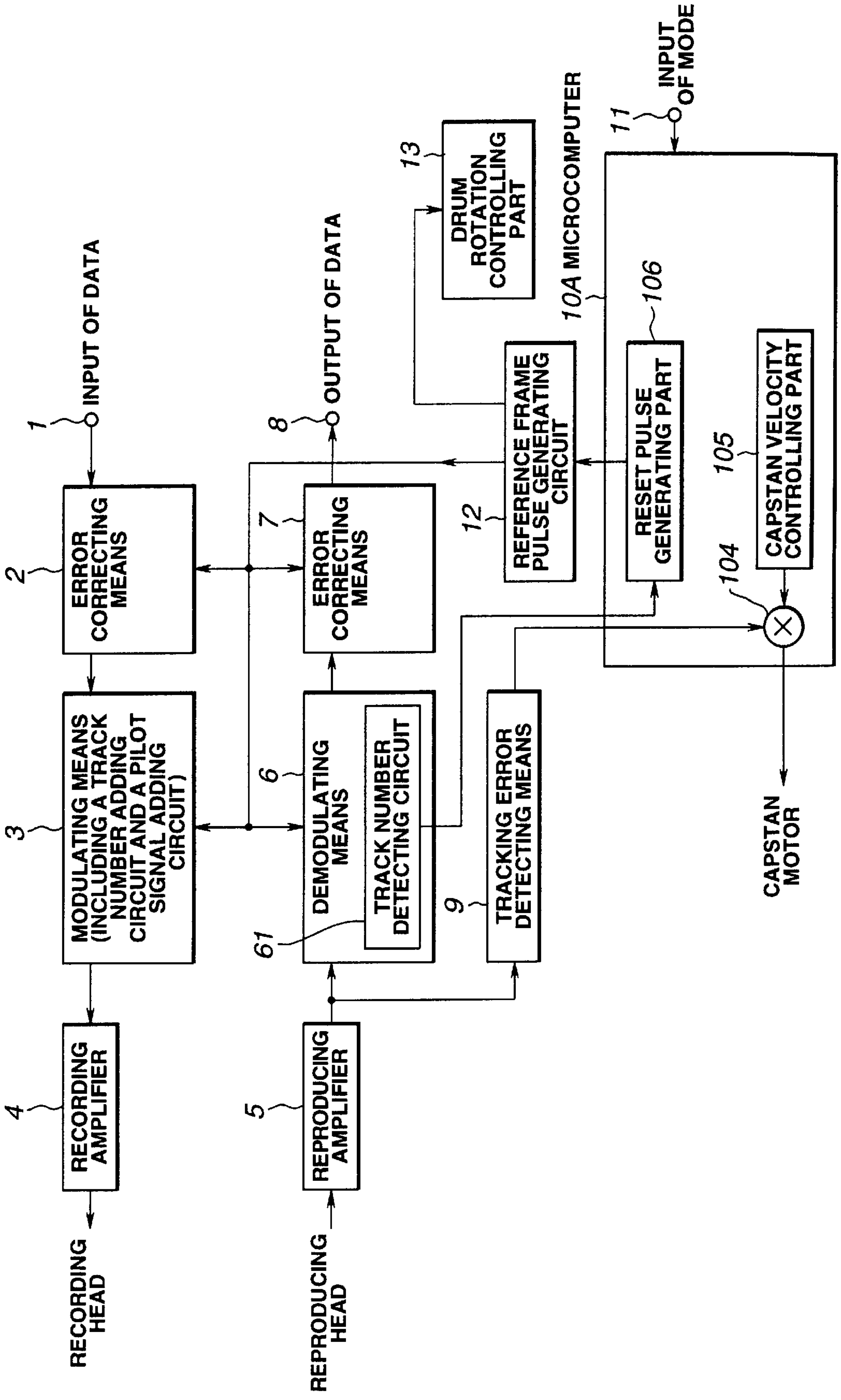
FIG. 4 is a block diagram showing another embodiment of the magnetic recording and reproducing apparatus of the present invention.

FIG. 4 is a block diagram showing a structure of another embodiment of the present invention. The present embodiment has a reset pulse generating part 106 which generates a reset pulse for synchronizing the phase of the reproducing frame in the microcomputer 10A and the reference frame pulse generating circuit 12 for generating a reference frame pulse is outside of the microcomputer 10A. The microcomputer 10A comprises the reset pulse generating part 106 that generates a reset pulse when the track number detecting means 9 detects the predetermined track number (for example, track number 8), a capstan velocity controlling part 105, a mixer 104 and a recording/reproducing mode setting means (not shown). Further, the reference frame pulse generating circuit 12 has a function to generate a drum reference pulse inside of it and generate a reference frame pulse synchronized with the drum reference pulse and a timing of the reset pulse from the reset pulse generating part 106. The drum rotation controlling part 13 controls the rotation of the drum based on the drum reference pulse obtained at the drum reference generating part in the reference frame pulse generating circuit 12. However, the same reference numeral is given to a part that has the same function as that of the preceding embodiment and explanation is omitted.

The operation of the present embodiment is described as follows.

The reproducing signal read from a magnetic tape (not shown) by the reproducing head is transmitted through the reproducing amplifier 5 to the demodulating means 6 including the track number detecting circuit 61 and the tracking error detecting means 9. The tracking error detecting means 9 detects the pilot signal included in the inputted reproducing signal, detects the tracking error information from the difference between the levels of more than two kinds of pilot signals obtained, and transmits the obtained error information to the microcomputer 10A. The microcomputer 10A mixes the inputted error information with the capstan velocity information from the capstan velocity controlling part 105 corresponding to the reproducing mode, controls the rotation of the capstan that runs a tape (not shown) based on it and adjusts tracking.

When the reset pulse generating part 106 of the microcomputer 10A receives the predetermined track number of the reproducing frame reproduced by the reproducing head at present, after the reset pulse generating part 106 determines the timing to synchronize the reference frame with the reproducing frame based on the track number, the reset pulse generating part 106 transmits the reset pulse to the reference frame pulse generating circuit 12 by this timing . The reference frame pulse generating circuit 12 receives the reset pulse signal from the microcomputer 10A and synchronizes the phase of the reference frame with that of the reproducing frame by resetting the phase of the generated reference frame pulse by the timing that has received the reset pulse.

Figures 5A, 5B, 5C:
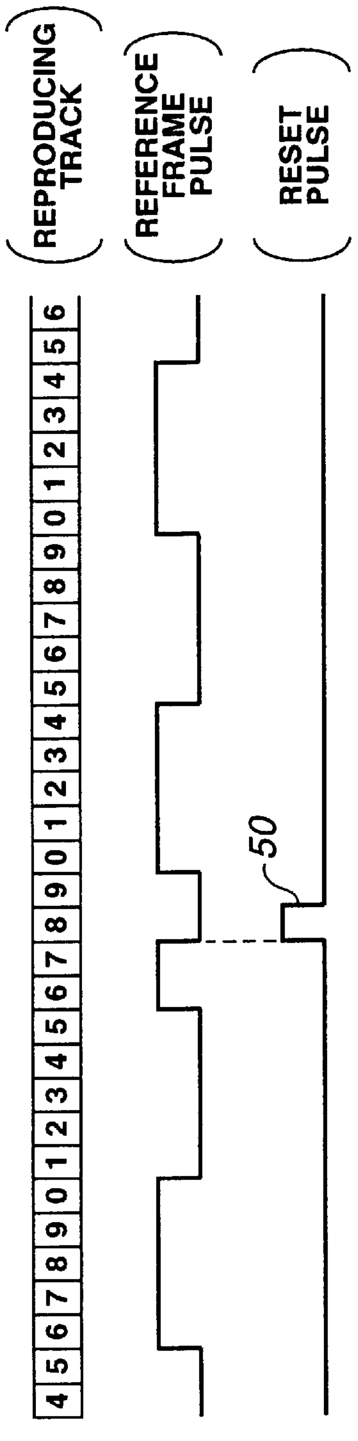
FIGS. 5(A) through (C) are timing charts explaining a method of setting the phase of the frame by a reference frame pulse generating circuit shown in FIG. 4.

FIGS. 5(A), (B) and (C) are timing charts describing the generation of a reference frame pulse. In this example, when the predetermined track number, for example, the track number 8, is detected from the reproducing frame (the reproducing track) as shown in FIG. 5(A), the reset pulse generating part 106 of the microcomputer 10A transmits a reset pulse 50 to the frame pulse generating circuit 12 as shown in FIG. 5(C) fitting to the track number 8. Thus, the reference frame pulse generating circuit 12 resets the reference frame pulse and makes it low level so that the outputted track of the reset pulse 50 is the eighth track phase of the reference frame pulse as shown in FIG. 5(B), adjusts the phase so that the rising edge (that is, the head) of the reference frame pulse is after the two reset tracks, and generates a new reference frame pulse.

Here, the reset pulse 50 is provided to the reference frame pulse generating circuit 12 for a period when the reproducing frame is at a low level. There are advantages in the possibility of shortening the a period before the frame is synchronized if the reset pulse 50 is transmitted to the reference frame pulse generating circuit 12 for a period when the reproducing frame is at a low level. This desired effect is illustrated by timing charts as shown in FIGS. 6(A) through (J).

Figures 6A, 6B, 6C, 6D, 6E, 6F, 6G, 6H, 6I, 6J:
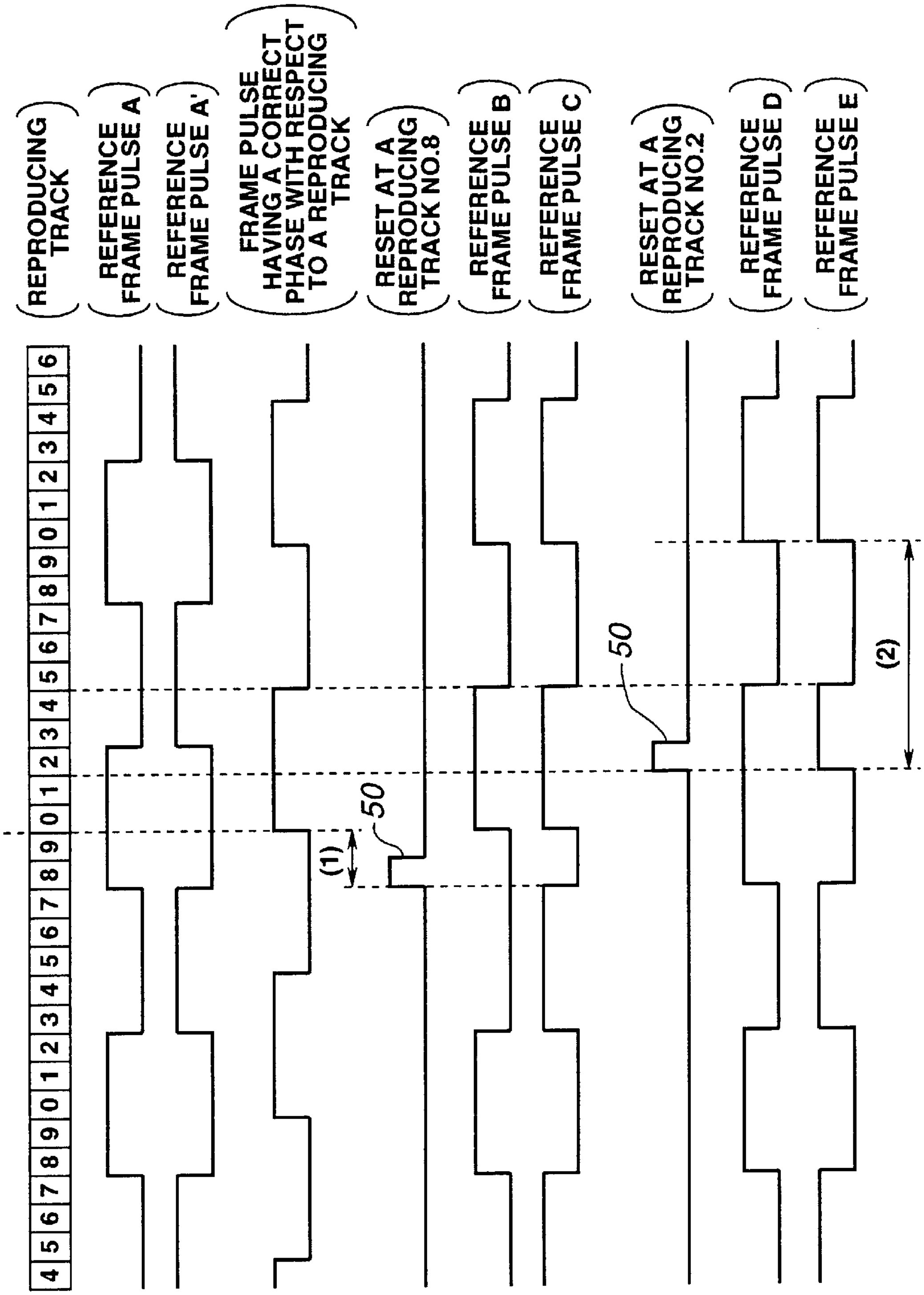
FIGS. 6(A) through (J) are timing charts explaining the relation between the reset pulse generating timing by a reset pulse generating part and the frame setting time in FIG. 4.

Referring to FIG. 6, a reference frame low level reset signal 50 is generated at track number 8 of the reproducing frame as shown in FIG. 6(A) and 6(E). FIG. 6(B) shows the reference frame pulse A before fitting the reference frame to the reproducing frame.

When this reference frame pulse A is reset at the track number 8, the reference frame pulse generating circuit 12 makes the level of the frame pulse low immediately at the reset timing as shown in FIG. 6(F). After two tracks as shown by reference (1), the level of the reference frame pulse B is made high at the timing of the track number 0 as shown in FIG. 6(F). The reference frame pulse as shown in FIG. 6(D) is made as mentioned above, and it is possible to quickly obtain a reset reference frame pulse in phase with the reproducing frame.

Here, the reference frame pulse C as shown in FIG. 6(G) is an example of how to reset the out of phase reference frame pulse A', shown in FIG. 6(C), by using the reset signal of FIG. 6(E). Reference pulse A' is an inverted version of reference frame pulse A. Reference frame pulse A' and A are also out of phase from the reproducing frame of FIG. 6(A). In this case, when the reset pulse is applied, it is possible to obtain the correct reference frame pulses after two tracks at a point of time when reset similarly. Notice that reference frame pulses B and C, shown in FIGS. 6(F) and 6(G), correspond to reference frame pulses A and A' respectively. Pulses B and C are both reset in phase with the reproducing frame after two tracks.

Next, suppose a reference frame high level signal 50 is generated at track number 2 of the reproducing frame. See FIG. 6(H). The reference frame pulse generating circuit track number 2 of the reproducing frame), the reference frame pulse generating circuit 12 makes the level of the reference frame pulse D low three tracks after the reference frame pulse generating circuit 12 makes the level of the reference frame pulse A high immediately to obtain the reference frame pulse D, in response to the high level reset signal of FIG. 6(H). It, is possible to obtain the correct rising edge (the head) of the frame after eight tracks as shown by feature (2) and FIG. 6(I).

The signal illustrated in FIG. 6(J) corresponds to reference frame pulse A' of FIG. 6(C), reset by the high level rest signal of FIG. 6(H) to obtain reference frame pulse E. When a reset pulse is applied at the timing shown in FIG. 6(H), it is similarly possible to obtain correct reference frame pulses after eight tracks of reset. It is understood that in either case of FIGS. 6(I) or 6(J), that synchronizing of the frame is delayed by six tracks more than the case reset for a period of low level of the reproducing frame. It is understood that, when using a low level reset signal as shown in FIG. 6(E), it is possible to synchronize the frame in a short time.

According to the present embodiment, by resetting the reference frame pulse at a timing based on the predetermined track number detected from the reproducing frame after locking the tracking, it is possible to generate a reference frame pulse of the phase synchronized with the phase of the reproducing frame and is possible to obtain the same effect as that of the preceding embodiment.

As mentioned above in detail, according to the frame synchronizing method of the present invention, it is possible to lead in tracking quickly without destroying the tracking lead and it is possible to synchronize immediately the phase of the reproducing frame with that of the reference frame.

The present invention is not limited only to the embodiments and it is possible to vary without deviating from the spirit and the range of the present invention.

What is claimed is:

1. A magnetic recording and reproducing apparatus which records and reproduces information in a manner such that one frame consists of a multiple of an even number of tracks, the magnetic recording and reproducing apparatus comprising:

means for recording information on a magnetic tape by a recording head to form tracks successively, the information being recorded including a pilot signal having tracking information and track numbers that show a track order;

means for reproducing the recorded information by a reproducing head to form a reproduced signal and for processing the reproduced signal, the reproducing means including means for demodulating the reproduced signal and for detecting track numbers from the reproduced signal;

means for detecting the pilot signal from the reproduced signal, for obtaining tracking error information based on the detected pilot signal, and for performing tracking between the reproducing head and the track of the frame being reproduced by using the tracking error information; and means for generating a reference frame pulse, the reference frame pulse being used to perform signal processing in a reproduction/processing mode, the reference frame pulse generating means setting a phase of the reference frame pulse to correspond to a track phase of a predetermined track number among track numbers detected by the track number detecting means and said reference frame pulse generating means providing the reference frame pulse to the reproduction/processing mode.

2. A magnetic recording and reproducing apparatus according to claim 1, wherein:

the reference frame pulse generating means includes means for generating a reset pulse corresponding to a predetermined track number among track numbers detected by the track number detecting means, wherein the phase of the reference frame pulse is reset by said reset pulse so that the reference frame pulse phase synchronizes with the phase of the track of a reproduced frame.

3. A magnetic recording and reproducing apparatus according to claim 2, wherein when a plurality of tracks forming a frame being reproduced are divided into a front half period having low track numbers and a rear half period having high track numbers, the reset pulse is generated during the rear half period having high track numbers of the frame being reproduced.

4. A magnetic recording and reproducing method of a magnetic recording and reproducing apparatus in which one frame consists of a multiple of an even number of tracks, the method comprising:

detecting a predetermined track number of a frame being reproduced after tracking between a reproducing head and the frame being reproduced is performed;

generating a reference frame pulse when the predetermined track number is detected; and synchronizing a phase of the frame being reproduced with a phase of the reference frame pulse corresponding to the predetermined track number by adjusting the phase of the reference frame pulse to match the phase of the reproduced frame.

5. A magnetic recording and reproducing method of a magnetic recording and reproducing apparatus according to claim 4 further comprising:

generating a reset pulse when the predetermined track number of the detected track numbers is detected, and wherein the synchronizing includes resetting the phase of the reference frame pulse by the generated reset pulse.

6. A magnetic recording and reproducing method of a magnetic recording and reproducing apparatus according to claim 5, the frame being reproduced having a plurality of tracks, the method comprising:

dividing the plurality of tracks into a front half period having low track numbers and a rear half period having high track numbers;

generating the reset pulse during the rear half period of the frame being reproduced.

7. A magnetic recording and reproducing apparatus for recording and reproducing information recorded in a manner such that one frame consists of a multiple of an even number of tracks, the magnetic recording and reproducing apparatus comprising:

a first error correction circuit which receives an input data signal and outputs a corrected data signal;

a modulation circuit which receives the corrected data signal adds a track number and a pilot signal to the corrected data signal and outputs a modulated signal;

an amplifier circuit which amplifies the modulated signal;

a recording head which records the amplified modulated signal and which forms tracks successively on a magnetic tape, the information being recorded including the pilot signal containing tracking information and the track numbers that show a track order;

a reproducing head which reproduces the recorded information to form a reproduced signal;

an amplifier circuit which amplifies the reproduced signal;

a tracking control circuit which detects the pilot signal from the reproduced signal and obtains tracking error information based on the detected pilot signal, and which performs tracking between the reproducing head and the track of the frame being reproduced by using the tracking error information;

a demodulation circuit which demodulates the reproduced signal and which includes a track number detection circuit which detects the track number of the track being reproduced from the pilot signal included therein;

a second error correction circuit which corrects error in the reproduced signal; and a reference frame pulse generating circuit which receives the track number and which performs data processing, the reference frame pulse generating circuit setting a phase of the reference frame pulse to correspond to a track phase of a predetermined track number among track numbers detected by the track number detection circuit and the reference frame pulse generating circuit providing the reference frame pulse to the modulating circuit, demodulating circuit, and the first and second error correction circuits.

8. A magnetic recording and reproducing apparatus as in claim 7, wherein:

the reference frame pulse generating circuit includes a reset pulse generating circuit which generates a reset pulse corresponding to a predetermined track number among track numbers detected by the track number detection circuit;

the reference frame pulse generating circuit synchronizes the phase of the reference frame pulse with the phase of the track of the frame being reproduced by resetting the phase of the reference frame pulse by the reset pulse; and the reference frame pulse generating circuit provides the reference frame pulse to the modulation circuit, demodulation circuit, and the first and second error correction circuits.

9. A magnetic recording and reproducing apparatus according to claim 8, wherein when a plurality of tracks forming a frame being reproduced are divided into a front half period having low track numbers and a rear half period having high track numbers, the reset pulse is generated during the rear half period having high track numbers of the frame being reproduced.

* * * * *